(12) United States Patent
Chen et al.

(10) Patent No.: US 10,070,279 B2
(45) Date of Patent: Sep. 4, 2018

(54) NETWORK APPARATUSES AND MESSAGE PROVIDING METHOD

(71) Applicant: Institute For Information Industry, Taipei (TW)

(72) Inventors: Yu-Hao Chen, Taipei (TW); Bo-Jiun Hsu, Taichung (TW); Ya-Wen Hsu, Hsinchu County (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/289,898

(22) Filed: Oct. 10, 2016

(65) Prior Publication Data
US 2018/0041880 A1 Feb. 8, 2018

(30) Foreign Application Priority Data

Aug. 2, 2016 (TW) .............................. 105124434 A (51) Int. Cl.
*H04W 4/14* (2009.01)
*H04M 1/72* (2006.01)
(Continued)

(52) U.S. Cl.
CPC ......... *H04W 4/14* (2013.01); *H04M 1/72583* (2013.01); *H04M 2250/10* (2013.01); *H04W 88/02* (2013.01)

(58) Field of Classification Search
CPC ............... H04L 12/587; H04L 12/5895; H04L 29/08108; H04L 29/08756;
(Continued)

(56) References Cited

U.S. PATENT DOCUMENTS 5,784,001 A * 7/1998 Deluca .................. G08B 5/226
340/7.53
9,396,264 B2 7/2016 Liu et al.
(Continued)

FOREIGN PATENT DOCUMENTS

TW I482482 B 4/2015
TW 201624311 A 7/2016

OTHER PUBLICATIONS

Office Action to the corresponding Taiwanese Patent Application No. 105124434 rendered by the Taiwan Intellectual Property Office (TIPO) dated Mar. 26, 2018, 7 pages (including English translation).

*Primary Examiner* — Sharad Rampuria
(74) *Attorney, Agent, or Firm* — Skaar Ulbrich Macari, P.A.

(57) ABSTRACT

Network apparatuses and a message providing method are provided. A network apparatus includes a processor, network interface, and display screen. The processor executes a message transmission application. The network interface transceives at least one message of the message transmission application. The display screen displays a window of the message transmission application. The window includes at least one icon and the at least one message. The processor determines that a selected icon of the at least one icon corresponds to a selected message of the at least one message. The processor derives at least one keyword by analyzing the selected message according to a semantic analysis rule corresponding to the selected icon. The processor derives at least one recommended message by searching a database according to the at least one keyword. The display screen displays the at least one recommended message.

12 Claims, 8 Drawing Sheets

(51) Int. Cl.
*H04M 1/725* (2006.01)
*H04W 88/02* (2009.01)

(58) Field of Classification Search
CPC ............. H04M 1/72547; H04M 3/537; H04M 1/72552; H04M 1/72522; H04W 4/12; H04W 4/14
See application file for complete search history.

(56) References Cited

U.S. PATENT DOCUMENTS

| | | | |
|---|---|---|---|
| 9,729,479 B2* | 8/2017 | Breedvelt-Schouten | ................... H04L 51/063 |
| 2002/0169759 A1 | 11/2002 | Kraft et al. | |
| 2009/0254618 A1 | 10/2009 | Arnold et al. | |
| 2012/0094700 A1* | 4/2012 | Karmarkar | .............. G06F 3/013 455/466 |
| 2013/0310013 A1* | 11/2013 | Cai | ......................... H04W 4/14 455/415 |
| 2016/0014151 A1* | 1/2016 | Prakash | .............. H04L 63/1483 726/22 |
| 2016/0036751 A1* | 2/2016 | Ban | .................... G06F 17/3087 455/414.1 |

* cited by examiner

NETWORK APPARATUSES AND MESSAGE PROVIDING METHOD

PRIORITY

This application claims priority to Taiwan Patent Application No. 105124434 filed on Aug. 2, 2016, which is hereby incorporated herein by reference in its entirety.

FIELD

The present invention relates to network apparatuses and a message providing method. Particularly, the present invention relates to network apparatuses and a message providing method that execute a message transmission application.

BACKGROUND

Due to rapid development of science and technologies, various network apparatuses (e.g., desktop computers, notebook computers, tablet computers, and smartphones) have become very popular. In addition, various message transmission applications (e.g., Short Message (SMS) software and instant communication software) that can be executed in network apparatuses are widely used.

Currently, a number of message transmission applications have been available on the market. These message transmission applications allow a user to exchange messages with other users via a message transmission interface (e.g., all users participating in the message exchange can input texts within a dialogue window) so that instant or non-instant message exchange can be accomplished. During the message exchange, sometimes the user needs to query other information (e.g., the weather, the traffic conditions, news, etc.) and transmit the query result to other users. When such a need arises, the user has to switch from the message transmission application to another application for querying and then return back to the message transmission application to share the query result. In other words, the user cannot query the information and share the query result when he/she is still using the message transmission application, which is inconvenient to the user.

Accordingly, there is still a need for a message transmission mechanism that allows the user to conveniently and quickly query the information when exchanging messages with other users.

SUMMARY

The disclosure includes a network communication apparatus. The network communication apparatus in certain embodiments comprises a processor, a network interface, and a display screen, wherein the processor is electrically connected to the network interface and the display screen. The processor executes a message transmission application. The network interface transceives at least one message of the message transmission application. The display screen displays a window of the message transmission application, wherein the window comprises at least one icon and the at least one message. The processor further determines that a selected icon of the at least one icon corresponds to a selected message of the at least one message, derives at least one keyword by analyzing a plurality of words comprised in the selected message according to a semantic analysis rule corresponding to the selected icon, and derives at least one recommendation message by searching a database according to the at least one keyword. The display screen further displays the at least one recommendation message.

The disclosure also includes a network communication apparatus. The network communication apparatus comprises a processor, a network interface, and a display screen, wherein the processor is electrically connected to the network interface and the display screen. The processor executes a message transmission application. The network interface transceives at least one message of the message transmission application. The display screen displays a window of the message transmission application, wherein the window comprises at least one icon and the at least one message. The processor further determines that a selected icon of the at least one icon corresponds to a selected message of the at least one message. The network interface further transmits an instruction message to a server, the server derives at least one keyword by analyzing a plurality of words comprised in the selected message according to a semantic analysis rule corresponding to the selected icon after receiving the instruction message, and the server derives at least one recommendation message by searching a database according to the at least one keyword. The network interface further receives a response message from the server, wherein the response message carries the at least one recommendation message. The display screen further displays the at least one recommendation message.

The disclosure further includes a message providing method, which comprises the following steps: (a) transceiving at least one message by the network communication apparatus, (b) displaying a window by the network communication apparatus, wherein the window comprises at least one icon and the at least one message, (c) determining that a selected icon of the at least one icon corresponds to a selected message of the at least one message by the network communication apparatus, (d) deriving at least one keyword by analyzing a plurality of words comprised in the selected message according to a semantic analysis rule corresponding to the selected icon by one of the network communication apparatus and a server, (e) deriving at least one first recommendation message by searching a database according to the at least one first keyword by one of the network communication apparatus and the server, and (f) displaying the at least one first recommendation message by the network communication apparatus.

The message transmission application executed in the network apparatus can provide icons within the window where the user is exchanging messages with other users. Each of the icons corresponds to a query category and each of the icons corresponds to a semantic analysis rule. The user may create a correspondence relationship between one of the icons (i.e., a selected icon) and one of the transceived messages (i.e., the selected message). The user creating the correspondence relationship between the selected icon and the selected message means that the user desires to query a recommendation message related to the selected message according to the query category corresponding to the selected icon. In response to the aforesaid operation of the user, the message transmission application derives at least one keyword by analyzing the selected message according to the semantic analysis rule corresponding to the selected icon and then derives at least one recommendation message by searching a database according to the at least one keyword. The display screen displays the at least one recommendation message so that the user can determine whether to select and transmit any of the at least one recommendation message. With the technology provided in the present invention, during the process that the user exchanges messages with other users, the user can derive the recommendation message related to the exchanged message through simple user interface (UI) operations and quickly transmit the recommendation message to the other users without switching away from the message transmission application.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the network apparatuses and the message providing method will be explained with reference to example embodiments thereof. However, these example embodiments are not intended to limit the present invention to any specific embodiments, examples, environment, applications, or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction. In addition, dimensional relationships among individual elements in the attached drawings are illustrated only for ease of understanding but not to limit the actual scale.

Figure 1A:
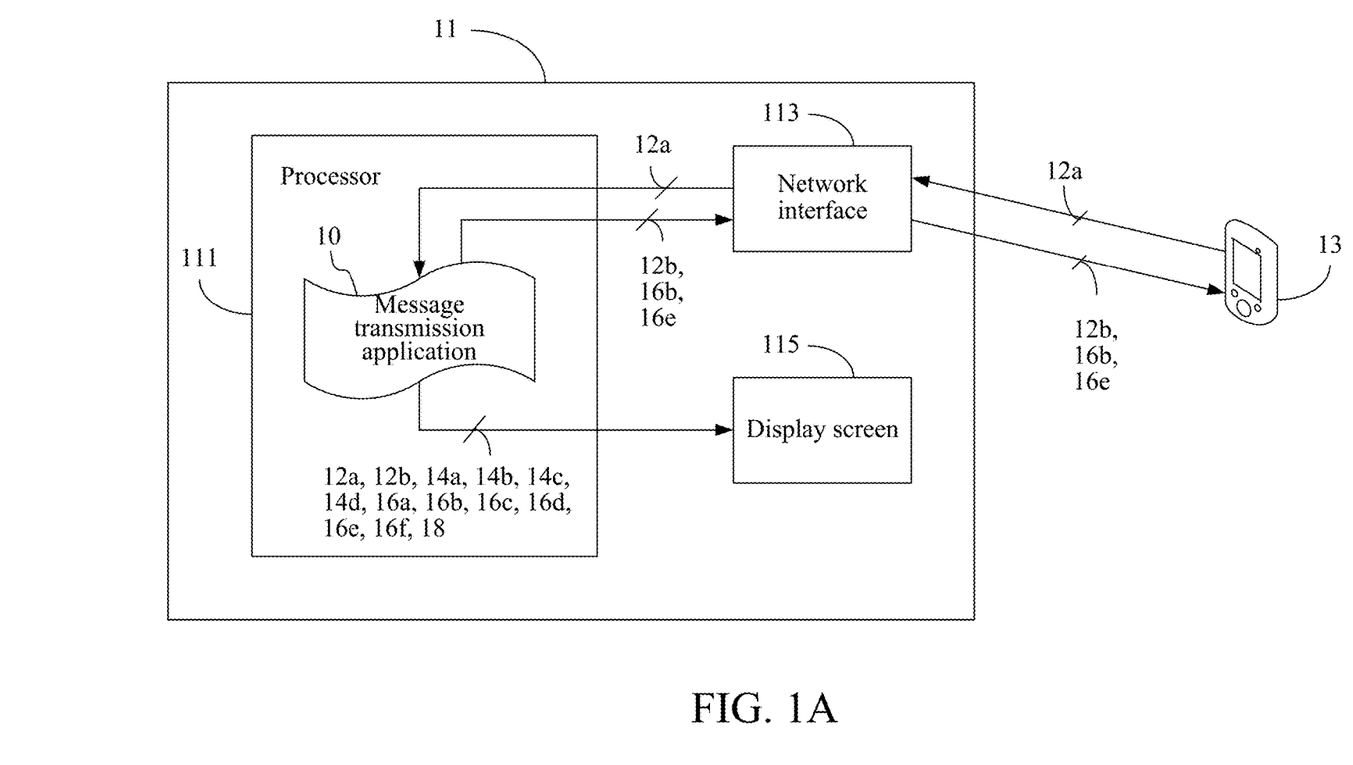
FIG. 1A is a schematic structural view of the network apparatus 11 of the first embodiment.

A first embodiment of the present invention is a network apparatus 11 and a schematic structural view of which is depicted in FIG. 1A. The network apparatus 11 comprises a processor 111, a network interface 113, and a display screen 115, wherein the processor 111 is electrically connected to the network interface 113 and the display screen 115. The network apparatus 11 may be a desktop computer, a notebook computer, a tablet computer, a smartphone, or any other electronic computing apparatus having a network function. The processor 111 may be a central processing unit (CPU), a microprocessor, or any other computing element known by those of ordinary skill in the art. The network interface 113 may be any interface that can receive and transmit a signal via a network. The display screen 115 may be a Liquid Crystal Display (LCD) screen, a Light-Emitting Diode (LED) screen, an Active-Matrix Organic Light-Emitting Diode (AMOLED) screen, or any other display apparatus/equipment that can display information provided by an electronic computing apparatus.

The network apparatus 11 has a message transmission application 10 installed therein. When the message transmission application 10 is executed by the processor 111 of the network apparatus 11, a user of the network apparatus 11 can exchange ideas/information (e.g., sending and/or receiving texts) with users of other network apparatuses that also have a message transmission application installed therein via the message transmission application 10. In some implementations, the message transmission application 10 may be SMS software. In some implementations, the message transmission application 10 may be instant communication software.

Figure 1B:
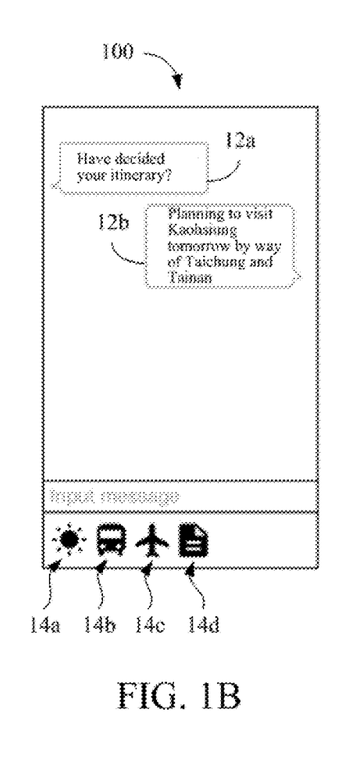
FIG. 1B is a schematic view of the window 100 of the message transmission application 10.

In this embodiment, the user has clicked the message transmission application 10 on the network apparatus 11 and the processor 111 has started to execute the message transmission application 10 in response to the click of the user. The network interface 113 has transceived two messages 12a, 12b of the message transmission application 10. In particular, the network interface 113 has received the message 12a of the message transmission application 10 from a smartphone 13 and sent the message 12b of the message transmission application 10 to the smartphone 13. The display screen 115 displays a window 100 of the message transmission application 10, wherein the window 100 comprises four icons 14a, 14b, 14c, 14d as well as the messages 12a, 12b transceived by the network interface 113 as illustrated in FIG. 1B. Each of the icons 14a, 14b, 14c, 14d corresponds to a query category. For example, the icons 14a, 14b, 14c, 14d may respectively corresponds to weather, bus route, flight, and news. Each query category corresponds to a semantic analysis rule, which may also be interpreted as each of the icons 14a, 14b, 14c, 14d corresponds to a semantic analysis rule.

During the process of exchanging messages with other users via the message transmission application 10, the user may create a correspondence relationship between one of the icons 14a, 14b, 14c, 14d (hereinafter referred to as "selected icon" for ease of understanding and description) and one of the messages 12a, 12b (hereinafter referred to as "selected message" for ease of understanding and description) to derive a recommendation message (to be detailed hereinbelow) related to the selected message and the selected icon. For example, if the network apparatus 11 is equipped with a mouse, the user may create a correspondence relationship between the selected icon and the selected message by dragging the selected icon to the selected message by the mouse. As another example, if the display screen 115 is a touch display screen, the user may drag the selected icon to the selected message through touch clicking. As still another example, the user may check the selected icon from the icons 14a, 14b, 14c, 14d and check the selected message from the message 12a, 12b to create the correspondence relationship therebetween. Creating the correspondence relationship between the selected icon and the selected message by the user means that the user desires to query a recommendation message related to the selected message according to the query category corresponding to the selected icon.

Figure 1C:
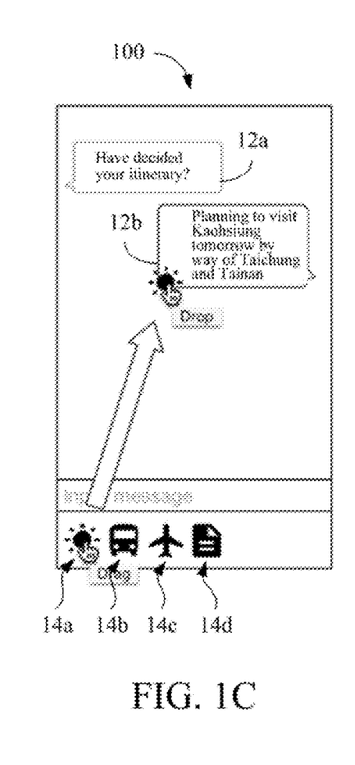
FIG. 1C is a schematic view depicting that a user drags the icon 14a to the message 12b to create a correspondence relationship.

Upon the user creates the correspondence relationship between the selected icon and the selected message, the processor 111 will determine that the selected icon has corresponded to the selected message. It is herein assumed that the user drags the icon 14a to the message 12b as illustrated in FIG. 1C. In this case, the icon 14a is the selected icon, while the message 12b is the selected message. In response to this, the processor 111 determines that the selected icon (i.e. the icon 14a) corresponds to the selected message (i.e. the message 12b). Afterwards, the processor 111 queries the recommendation message related to the selected message according to the query category corresponding to the selected icon, which is accomplished in two phases. Generally speaking, the first phase is to derive at least one keyword by analyzing the selected message according to the semantic analysis rule corresponding to the selected icon and the second phase is to derive at least one recommendation message by searching a database according to the at least one keyword. It shall be noted that, in some implementations, an analysis result of the first phase may contain no keyword. Similarly, in some implementations, a search result of the second phase may contain no recommendation message.

Operations of the first phase will now be described. As mentioned above, each of the icons 14a, 14b, 14c, 14d corresponds to a query category and each query category corresponds to a semantic analysis rule. In other words, each of the icons 14a, 14b, 14c, 14d corresponds to a semantic analysis rule and the content of a semantic analysis rule is related to its corresponding query category. In some implementations, keywords of one single category (e.g., only including keywords of the "location" category) may be derived when analyzing the selected message according to a semantic analysis rule. In some embodiments, keywords of multiple categories (e.g., including keywords of the "location" category and keywords of the "time" category) may be derived when analyzing the selected message according to a semantic analysis rule. Those of ordinary skill in the art will appreciate that a semantic analysis rule may be implemented via various algorithms/models, e.g., the Viterbi algorithm and the Hidden Markov Model (HMM). Those of ordinary skill in the art will appreciate that the present invention does not focus on how to implement a semantic analysis rule or proposing a new semantic analysis rule. The present invention utilizes a semantic analysis rule to derive keyword(s) of the selected message.

In particular, in this embodiment, once the processor 111 determines that the selected icon (i.e., the icon 14a) corresponds to the selected message (i.e., the message 12b), the processor 111 analyzes a plurality of words comprised in the selected message (i.e., the message 12b) according to the semantic analysis rule corresponding to the selected icon (i.e., the icon 14a). Two keywords, respectively being "Taichung" and "Kaohsiung", of the same category are derived through the analysis by the processor 111. It shall be noted that when the selected icon and/or the selected message are different, another number of keywords may be derived through semantic analysis. In other embodiments, once the processor 111 determines that the selected icon (i.e., the icon 14a) corresponds to the selected message (i.e., the message 12b), keywords of multiple categories may be derived by the processor 111 through analyzing the selected message (i.e., the message 12b) according to the semantic analysis rule corresponding to the selected icon (i.e., the icon 14a). For example, two keywords (i.e., "Taichung" and "Kaohsiung") of a first category (i.e., the category being "location") and one keyword (i.e., "tomorrow") of a second category (i.e., the category being "time") are derived by the processor 111 through the analysis.

Operations of the second phase will now be described. In this phase, the processor 111 derives at least one recommendation message by searching a database (not shown) according to the keyword derived through the analysis. In this embodiment, the processor 111 derives two recommendation messages (i.e., weather of Taichung and weather of Kaohsiung) 16a, 16b by searching a database (e.g., a meteorological database of the meteorological bureau) according to the keywords (i.e., "Taichung" and "Kaohsiung") derived through the analysis. In other embodiments, if keywords of multiple categories (e.g., "Taichung," "Kaohsiung," and "tomorrow") have been derived through the analysis by the processor 111 previously, the processor 111 will derive the recommendation messages by searching the database according to the keywords of these categories. Moreover, in other embodiments, the network apparatus 11 may be equipped with a Global Positioning System (GPS) module. In such embodiments, the processor 111 may derive the recommendation messages by searching the database according to location information of the network apparatus 11 provided by the GPS module and the keywords derived through the semantic analysis.

Figure 1D:
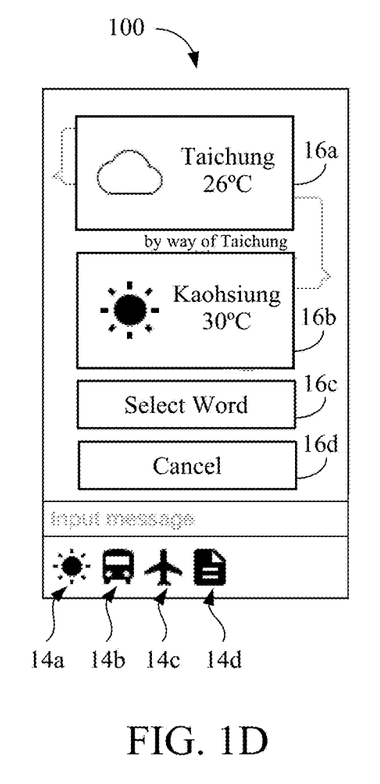
FIG. 1D is a schematic view depicting a display frame of the network apparatus 11 after a recommendation message is searched out.

After at least one recommendation message is searched out by the processor 111, the display screen 115 displays the at least one recommendation message so that the user can evaluate whether to select and transmit the at least one recommendation message. In the present embodiment, the processor 111 searches out two recommendation messages (i.e., the weather of Taichung and the weather of Kaohsiung) 16a, 16b and the display screen 115 displays the two recommendation messages 16a, 16b, a "Select Word" option 16c and a "Cancel" option 16d as illustrated in FIG. 1D so that user can select therefrom. It shall be noted that, in other embodiments, the display screen 115 may omit the display of the "Select Word" option 16c and the "Cancel" option 16d in this phase. Then, the user may select any of the recommendation messages 16a, 16b, the "Select Word" option 16c and the "Cancel" option 16d. When the user selects different options, the network apparatus 11 will act differently in subsequent operations, which will be respectively described hereinbelow.

Figure 1E:
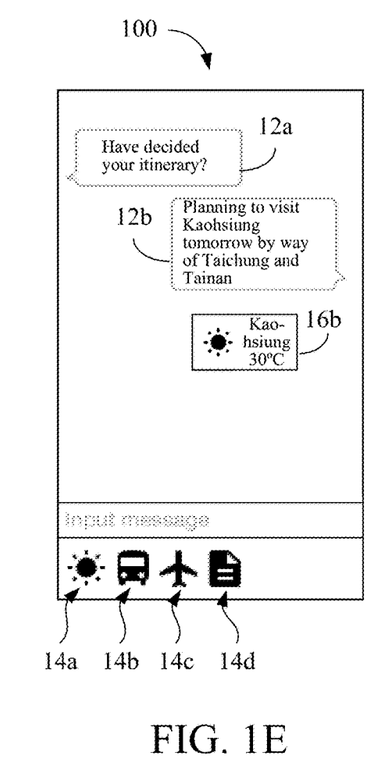
FIG. 1E is a schematic view depicting the window 100 after the user selects a recommendation message 16b.

First, it is assumed that the user selects the recommendation message 16b, which may be considered as a selected recommendation message. Upon the operation performed by the user, the processor 111 will determine that the selected recommendation message (i.e., the recommendation message 16b) is selected. Then, the network interface 113 transmits the selected recommendation message (i.e., the recommendation message 16b) to the smartphone 13 and the display screen 115 displays the selected recommendation message (i.e., the recommendation message 16b) within the window 100 as illustrated in FIG. 1E. It is noted that when the user selects the recommendation message 16a as the selected recommendation message, the subsequent operations performed by the network apparatus 11 are the same as those performed by the network apparatus 11 when the user selects the recommendation message 16b. Hence, the details are not repeated herein.

Figure 1F:
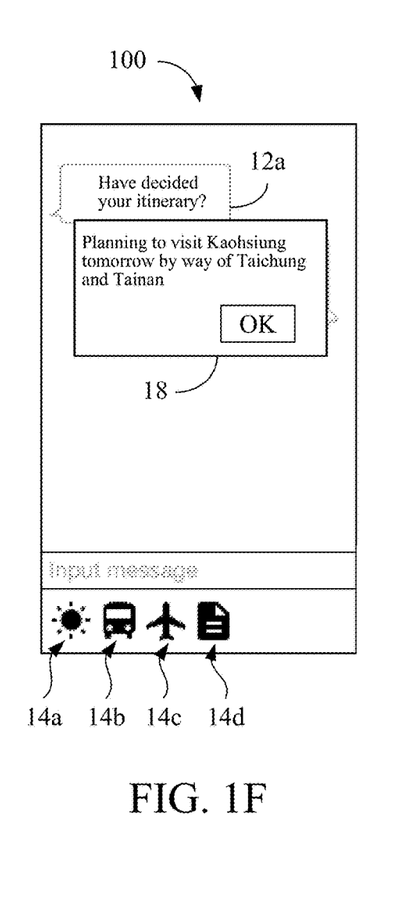
FIG. 1F is a schematic view depicting an operation after the user selects the "Select Word" option 16c.

Next, operations that will be performed by the network apparatus 11 after the user selects the "Select Word" option 16c will be described. In response to the user selection of "Select Work" option 16c, the display screen 115 displays an input window 18 comprising the selected message (i.e., the message 12b) and an "OK" button as illustrated in FIG. 1F.

Figure 1G:
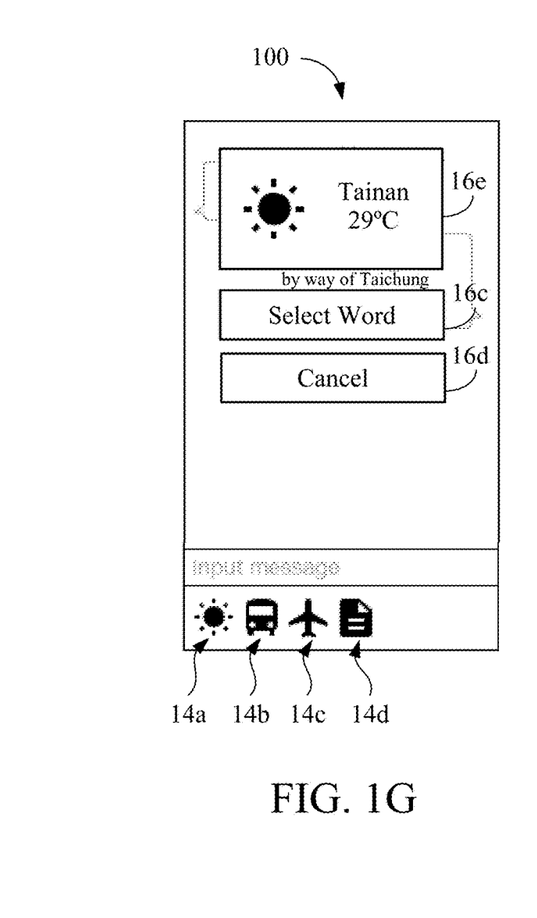
FIG. 1G is a schematic view depicting a display frame of the network apparatus 11 after another recommendation message 16e is searched out.
Figure 1H:
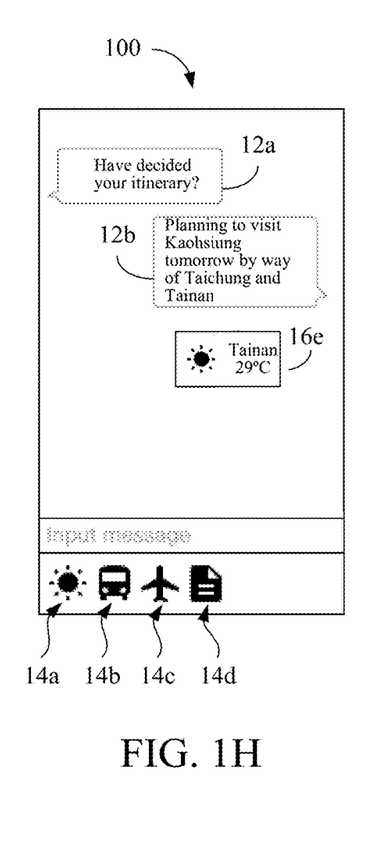
FIG. 1H is a schematic view depicting the window 100 after the user selects the recommendation message 16e.

The user may click a certain keyword (e.g., "Tainan") in the selected message (i.e., the message 12b), and then click the "OK" button for query. Once the user clicks the "OK" button, the processor 111 determines that a keyword of the words comprised in the selected message (i.e., the message 12b) is selected. In response to that, the processor 115 derives another recommendation message (i.e., the weather of Tainan) 16e by searching the database according to the keyword (i.e., "Tainan"). Then, the display screen 115 displays the recommendation message 16e, the "Select Word" option 16c and the "Cancel" option 16d as illustrated in FIG. 1G. If the user selects the recommendation message 16e, the processor 111 will determine that this recommendation message 16e is selected, the network interface 113 will transmit the recommendation message 16e to the smartphone 13, and the display screen 115 will display the recommendation message (i.e., the weather of Tainan) 16e within the window 100 as illustrated in FIG. 1H.

Figure 1I:
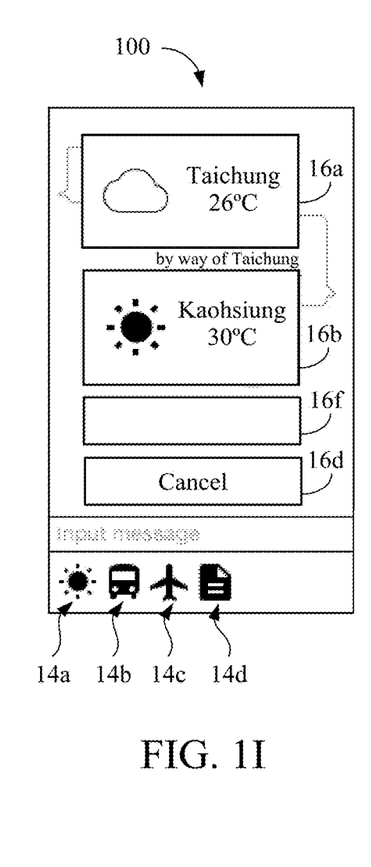
FIG. 1I is a schematic view depicting an implementation that can replace that of FIG. 1D.

It shall be noted that, in other embodiments, the display screen 115 may display a frame as shown in FIG. 1I instead of the frame of FIG. 1D. In FIG. 1I, the display screen 115 displays the recommendation messages 16a, 16b, an input area 16f, and the "Cancel" option 16d. For those embodiments, the network apparatus 11 further comprises an input interface (not shown) electrically connected to the processor 111. The user may input a keyword to be queried (e.g., "Tainan") in the input area 16f via the input interface. Similarly, once the keyword is received by the input interface, the processor 111 searches the database according to this keyword to derive the recommendation message (i.e., the weather of Tainan) 16e. The display screen 115 displays this recommendation message 16e, the "Select Word" option 16c, and the "Cancel: option 16d for the user to select, as illustrated in FIG. 1G. If the user selects the recommendation message 16e, the processor 111 will determine that this recommendation message 16e is selected, the network interface 113 will transmit the recommendation message (i.e., the weather of Tainan) 16e to the smartphone 13, and the display screen 115 will display the recommendation message (i.e., the weather of Tainan) 16e within the window 100 as illustrated in FIG. 1H.

If the user clicks the "Cancel" option 16d on the display screen 115 illustrated in FIG. 1D, the display screen 115 will return back to the frame illustrated in FIG. 1B. Similarly, if the user clicks the "Cancel" option 16d on the display screen 115 illustrated in FIG. 1G or FIG. 1I, the display screen 115 will return back to the frame illustrated in FIG. 1B.

According to the aforesaid descriptions, the message transmission application 10 executed by the network apparatus 11 provides icons on the window where the user is exchanging messages with other users (e.g., the aforesaid window 100 comprises the four icons 14a, 14b, 14c, 14d) and each of the icons corresponds to a query category. The user can create a correspondence relationship between one (i.e., the selected icon) of the icons (e.g., the icons 14a, 14b, 14c, 14d) and one (i.e., the selected message) of the transceived message (e.g., the aforesaid messages 12a, 12b). The user creating the correspondence relationship between the selected icon and the selected message means that the user desires to query a recommendation message related to the selected message according to the query category corresponding to the selected icon. In response to the user's operation, the network apparatus 11 performs semantic analysis, searches the database, and displays the recommendation message according to a search result. If the recommendation message provided by the network apparatus 11 meets the user's needs, the user may select the recommendation message directly. If the recommendation message provided by the network apparatus 11 does not meet the user's needs, the user may directly input other keywords so that the network apparatus 11 will search again and provide other recommendation messages. Once the user selects a recommendation message which meets the user's needs, the network apparatus 11 transmits the recommendation message selected by the user directly to the other users involved in the message exchange. Therefore, during the process that the user exchanges messages with other users via the network apparatus 11 of this embodiment, the user can derive the recommendation message related to the exchanged message through simple user interface operations and quickly transmit the recommendation message to other users involved in the message exchange without switching away from the message transmission application 10.

Figure 2:
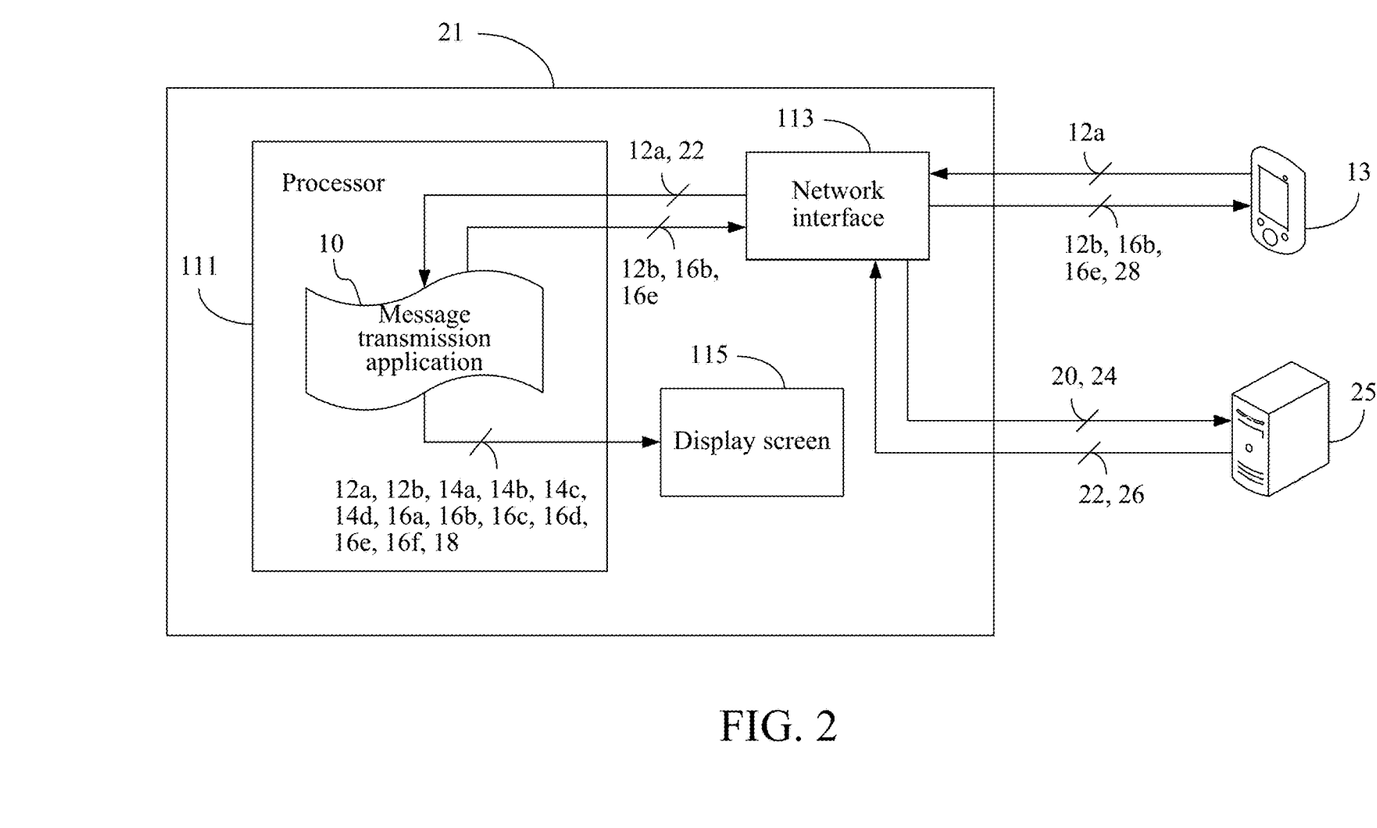
FIG. 2 is a schematic structural view of the network apparatus 21 of the second embodiment.

A second embodiment of the present invention is a network apparatus 21 and a schematic structural view of which is depicted in FIG. 2. The network apparatus 21 comprises the processor 111, the network interface 113, and the display screen 115 as described in the first embodiment. The network apparatus 21 is connected to a server 25 via the network interface 113. The network apparatus 21 has the message transmission application 10 installed therein. When the message transmission application 10 is executed by the processor 111 of the network apparatus 21, a user of the network apparatus 21 can exchange ideas/information (e.g., sending and/or receiving words) with users of other network apparatuses that also have a message transmission application installed therein via the message transmission application 10. In some implementations, the message transmission application 10 may be SMS software. In some implementations, the message transmission application 10 may be instant communication software.

The second embodiment is similar to the first embodiment and the main difference therebetween is that the message transmission application 10 of this embodiment instructs the server 25 to perform semantic analysis and database searching. The following description will focus on the difference between the two embodiments.

In this embodiment, the user has clicked the message transmission application 10 on the network apparatus 21 and the processor 111 has started to execute the message transmission application 10 in response to the click of the user. The network interface 113 has received the message 12a of the message transmission application 10 from the smartphone 13 and sent the message 12b of the message transmission application 10 to the smartphone 13. The display screen 115 displays a window 100 of the message transmission application 10, wherein the window 100 comprises four icons 14a, 14b, 14c, 14d as well as the message 12a, 12b transceived by the network interface 113 as illustrated in FIG. 1B. Each of the icons 14a, 14b, 14c, 14d corresponds to a query category, while each query category corresponds to a semantic analysis rule.

In this embodiment, if the processor 111 determines that a selected icon (e.g., the icon 14a) of the icons 14a, 14b, 14c, 14d corresponds to a selected message (e.g., the message 12b) of the messages 12a, 12b, the network interface 113 will transmit an instruction message 20 to the server 25. In some implementations, the instruction message 20 carries information (e.g., an identification code of the selected icon) related to the selected icon (i.e., the icon 14a) and the selected message (i.e., the message 12b). In some implementations, the instruction message 20 carries information related to the selected icon (i.e., the icon 14a) and the network interface 113 transmits the selected message (i.e., the message 12b) to the server 25 separately. After receiving the instruction message 20, the server 25 derives at least one keyword by analyzing a plurality of words comprised in the selected message (i.e., the message 12b) according to a semantic analysis rule corresponding to the selected icon (i.e., the icon 14a) and derives two recommendation messages 16a, 16b by searching a database (not shown) according to the at least one keyword. It shall be noted that, in other embodiments, the network apparatus 21 may be equipped with a GPS module (not shown). For those embodiments, the GPS module may provide location information 28 of the network apparatus 21 and the network interface 115 may further transmits the location information 28 to the server 25. The server 25 may derive the recommendation message 16a, 16b by searching the database according to the location information 28 and the keyword derived from the semantic analysis.

Then, the server 25 transmits a response message 22 carrying the recommendation messages 16a, 16b to the network apparatus 21. The network interface 113 of the network apparatus 21 receives the response message 22 from the server 25 and the display screen 115 displays the recommendation messages 16a, 16b comprised in the response message 22, the "Select Word" option 16c, and the "Cancel" option 16d for the user to select as illustrated in FIG. 1D. It shall be noted that, in some other embodiments, the display screen 115 may omit the display of the "Select Word" option 16c and the "Cancel" option 16d. Similar to the first embodiment, when the user selects different options, the network apparatus 21 acts differently in the subsequent operations.

Assuming that the user selects the recommendation message 16b, then this recommendation message 16b may be considered as a selected recommendation message. Upon the user selects the recommendation message 16b, the processor 111 determines that the selected recommendation message (i.e., the recommendation message 16b) is selected. Then, the network interface 113 transmits the selected recommendation message (i.e., the recommendation message 16b) to the smartphone 13 and the display screen 115 further displays the selected recommendation message (i.e., the recommendation message 16b) within the window 100 as illustrated in FIG. 1E. Besides, if the user selects the recommendation message 16a, the subsequent operations performed by the network apparatus 21 are the same as those performed by the network apparatus 21 when the user selects the recommendation message 16b. Hence, the details are not repeated herein.

Next, the operations that will be performed when the user selects the "Select Word" option 16c will be described. When this operation is performed by the user, the display screen 115 displays an input window 18 comprising the selected message (i.e., the message 12b) and an "OK" button as illustrated in FIG. 1F. The user may click a keyword (e.g., "Tainan") in the selected message (i.e., the message 12b) and then click the "OK" button for query. Once the user clicks the "OK" button, the network interface 113 transmits an instruction message 24 to the server 25, wherein the instruction message 24 carries the keyword selected by the user. After receiving the instruction message 24, the server 25 derives another recommendation message 16e by searching the database according to the keyword carried in the instruction message 24. Then, the server 25 transmits a response message 26 carrying the recommendation message 16e therein to the network apparatus 21. The network interface 113 of the network apparatus 21 receives the response message 26 from the server 25. The display screen 115 displays the recommendation message 16e comprised in the response message 26, a "Select Word" option 16c, and a "Cancel" option 16d as illustrated in FIG. 1G so that the use can select therefrom. If the user selects the recommendation message 16e, the processor 111 will determine that this recommendation message 16e is selected, the network interface 113 will transmit the recommendation message 16e to the smartphone 13, and the display screen 115 will display the recommendation message (i.e., the weather of Tainan) 16e within the window 100 as illustrated in FIG. 1H.

It shall be noted that, in other embodiments, the display screen 115 may display a frame as shown in FIG. 1I instead of a frame of FIG. 1D. In FIG. 1I, the display screen 115 displays the recommendation messages 16a, 16b, an input area 16f, and the "Cancel" option 16d. For those embodiments, the network apparatus 11 further comprises an input interface (not shown) electrically connected to the processor 111. The user may input a keyword to be queried (e.g., "Tainan") in the input area 16f via the input interface. Similarly, once the input interface receives this keyword, the network interface 113 transmits the instruction message 24 to the server 25, wherein the instruction message 24 carries the keyword inputted by the user. Similarly, after receiving the instruction message 24, the server 25 derives another recommendation message 16e by searching the database according to the keyword carried in the instruction message 24. Then, the server 25 transmits a response message 26 carrying the recommendation message 16e therein to the network apparatus 21. The network interface 113 of the network apparatus 21 receives the response message 26 from the server 25. The display screen 115 displays the recommendation message 16e comprised in the response message 26, the "Select Word" option 16c, and the "Cancel" option 16d as illustrated in FIG. 1G so that the user can select therefrom. If the user selects the recommendation message 16e, the processor 111 will determine that this recommendation message 16e is selected, the network interface 113 will transmit the recommendation message 16e to the smartphone 13, and the display screen 115 will display the recommendation message (i.e., the weather of Tainan) 16e within the window 100 as illustrated in FIG. 1H.

If the user clicks the "Cancel" option 16d on the display screen 115 illustrated in FIG. 1D, the display screen 115 will return to the frame illustrated in FIG. 1B. Similarly, if the user clicks the "Cancel" option 16d on the display screen 115 illustrated in FIG. 1G or FIG. 1I, the display screen 115 will return to the frame illustrated in FIG. 1B.

According to the above descriptions, the message transmission application 10 executed by the network apparatus 21 also provides icons on the window where the user is exchanging messages with other users, wherein each of the icons corresponds to a query category. The user can also create a correspondence relationship between one of the icons (i.e., the selected icon) and one of the transceived messages so as to query the recommendation message related to the selected message according to the query category corresponding to the selected icons. The difference between the second embodiment and the first embodiment lies in that the semantic analysis and the database searching are performed by the server 25 in the second embodiment. Once the recommendation message is searched out by the server 25, the network apparatus 21 displays the recommendation message so that the user can evaluate whether to select and transmit the recommendation message. Similarly, if the recommendation message provided by the server 25 meets the user's needs, the user may select the recommendation message directly. If the recommendation message provided by the server 25 does not meet the user's needs, the user may directly input other keywords to enable the server 25 to search again and to provide other recommendation messages. Once a recommendation message meets the user's needs is selected by the user, the network apparatus 21 transmits the recommendation message selected by the user directly to other users involved in the message exchange. Therefore, during the process that the user exchanges messages with other users via the network apparatus 21 and the server 25 of this embodiment, the user can derive the recommendation message related to the exchanged message through simple user interface operations and quickly transmit the recommendation message to the other users involved in the message exchange without having to switch away from the message transmission application 10.

Figure 3A:
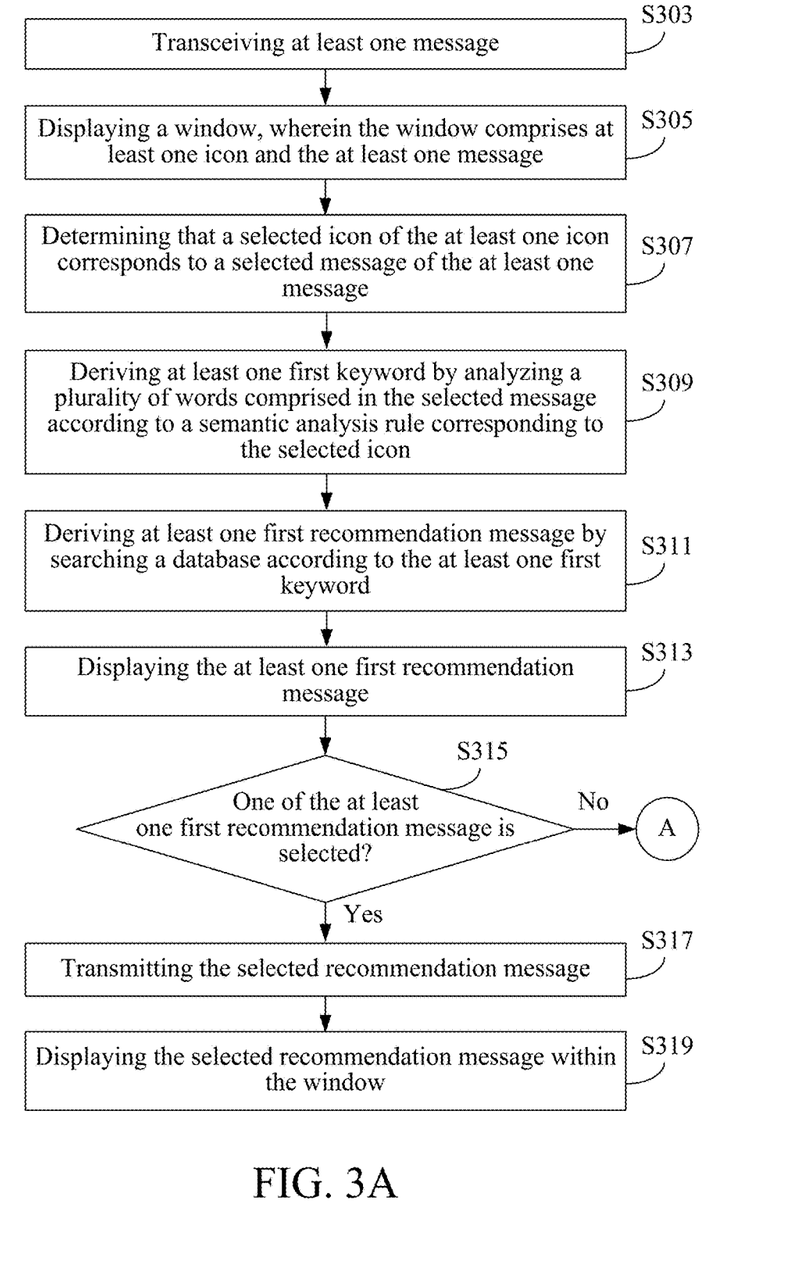
FIGS. 3A and 3B are flow diagrams of the third embodiment.
Figure 3B:
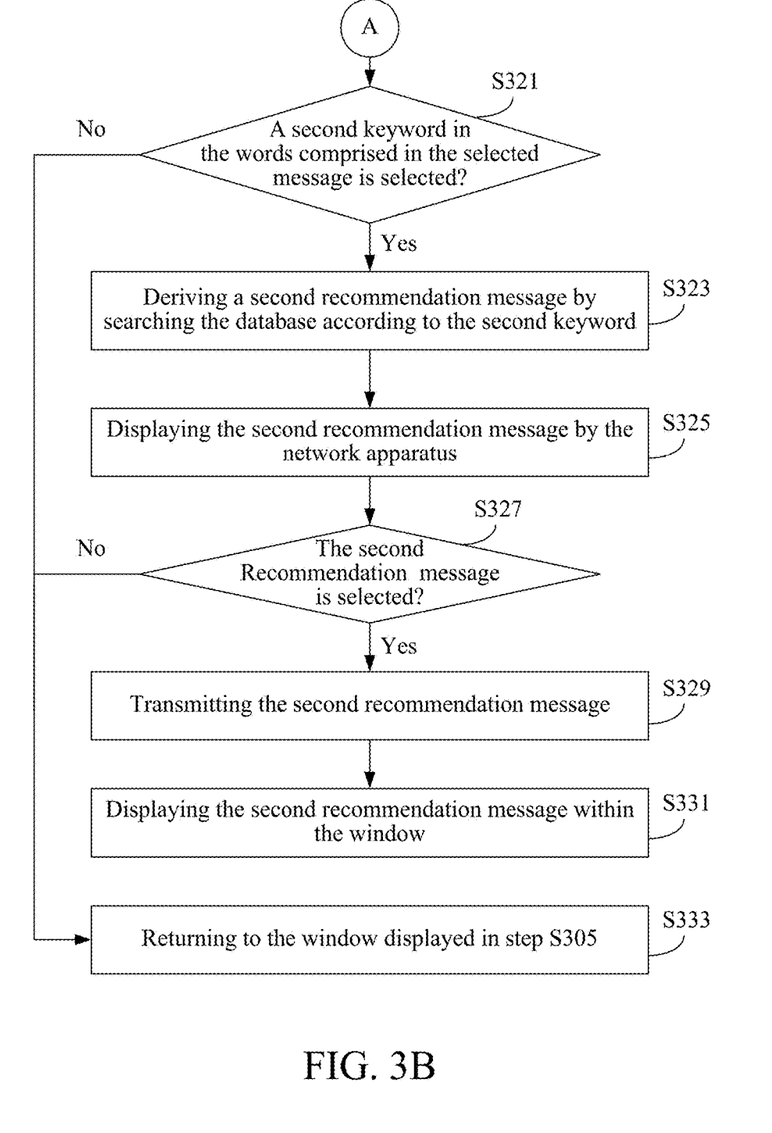

A third embodiment of the present invention is a message providing method and a flow diagram of which is depicted in FIG. 3A and FIG. 3B. Firstly, step S303 is executed to transceive at least one message by a network apparatus (e.g., one of the network apparatuses 11, 21). Then, step S305 is executed to display a window by the network apparatus, wherein the window comprises at least one icon and the at least one message. Next, step S307 is executed to determine that a selected icon of the at least one icon corresponds to a selected message of the at least one message by the network apparatus.

Following that, step S309 is executed to derive at least one first keyword by analyzing a plurality of words comprised in the selected message according to a semantic analysis rule corresponding to the selected icon by one of the network apparatus and a server (e.g., the server 25). Then, step S311 is executed to derive at least one first recommendation message by searching a database according to the at least one first keyword by one of the network apparatus and the server. It shall be noted that, in some embodiments, at least one second keyword is further derived in addition to the at least one first keyword as the analysis result of the step S309. The at least one first keyword is of a first category, the at least one second keyword is of a second category, and the first category and the second category are different. In such embodiments, the step S311 is to derive the at least one first recommendation message by searching the database according to the at least one first keyword and the at least one second keyword. Additionally, in some other embodiments, the step S311 derives the at least one first recommendation message by searching the database according to the at least one first keyword and the location information.

Afterwards, step S313 is executed to display the at least one first recommendation message by the network apparatus. Step S315 is executed by the network apparatus to determine whether one of the at least one first recommendation message is selected. If the determination result of the step S315 is "Yes," the selected one is called a selected recommendation message and the step S317 will then be executed. Step 317 is executed to transmit the selected recommendation message by the network apparatus. Then, step S319 is executed to display the selected recommendation message within the window by the network apparatus.

If the determination result of step S315 is "No," step S321 is executed by the network apparatus to determine whether a second keyword in the words comprised in the selected message is selected. It shall be noted that, in some embodiments, step S321 may be changed to determine whether the network apparatus receives a second keyword. If the determination result of the step S321 is "No," step S333 will be executed to return back to the window displayed in the step S305. If the determination result of the step S321 is "Yes," step S323 will be executed to derive a second recommendation message by searching the database according to the second keyword by one of the network apparatus and the server. Then, step S325 is executed to display the second recommendation message by the network apparatus.

Following that, step S327 is executed by the network apparatus to determine whether the second recommendation message is selected. If the determination result of step S327 is "Yes," step S329 will be executed to transmit the second recommendation message by the network apparatus. Then, step S331 is executed to display the second recommendation message within the window by the network apparatus. If the determination result of step S327 is "No," step S333 will be executed to return back to the window displayed in the step S305.

In addition to the aforesaid steps, the third embodiment can also execute all the operations and steps of the network apparatuses 11, 21 and the server 25 set forth in the first embodiment and the second embodiment to accomplish the same functions and deliver the same technical effects as the first embodiment and the second embodiment. How the third embodiment executes these operations and functions to accomplish the same functions and deliver the same technical effects will be readily appreciated by those of ordinary skill in the art based on the explanation of the first embodiment and the second embodiment, and thus will not be further described herein.

The message providing method described in the third embodiment may be implemented by a computer program. The computer program is stored in a non-transitory computer readable storage medium. When the instructions comprised in the computer program are loaded into a network apparatus (e.g., the network apparatus 11 or 21), the computer program executes the message providing method described in the third embodiment. The non-transitory computer readable storage medium may be an electronic product, e.g., a read only memory (ROM), a flash memory, a floppy disk, a hard disk, a compact disk (CD), a mobile disk, a magnetic tape, a database accessible to networks, or any other storage media with the same function and well known to those of ordinary skills in the art.

It shall be noted that throughout the present specification and the claims, the terms "first" and "second" in "the first keyword" and "the second keyword" are used only to distinguish these keywords belonging to different categories, the terms "first" and "second" in "the first category" and "the second category" are used only to distinguish that these categories are different, and the terms "first" and "second" in "the first recommendation message" and "the second recommendation message" are used only to distinguish that these recommendation messages are of different phases.

According to the technology provided in the present invention, the message transmission application executed in the network apparatus provides icons within the window where the user is exchanging messages with other users. Each of the icons corresponds to a query category and each of the icons corresponds to a semantic analysis rule. The user can create a correspondence relationship between one of the icons (i.e., a selected icon) and one of the transceived messages (i.e., a selected message). The user creating the correspondence relationship between the selected icon and the selected message means that the user desires to query a recommendation message related to the selected message according to the query category corresponding to the selected icon. In response to the aforesaid operation of the user, the message transmission application derives at least one keyword by analyzing the selected message according to the semantic analysis rule corresponding to the selected icon and further derives at least one recommendation message by searching a database according to the at least one keyword. The display screen displays the at least one recommendation message so that the user can determine whether to select and transmit the at least one recommendation message. With the technology provided in the present invention, during the process that the user exchanges messages with other users, the user can derive the recommendation message related to the exchanged message through simple user interface operations and quickly transmit the recommendation message to the other users without switching away from the message transmission application.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network apparatus, comprising:
   a processor, being configured to execute a message transmission application;
   a network interface, being electrically connected to the processor and configured to transceive at least one message of the message transmission application; and
   a display screen, being electrically connected to the processor and configured to display a window of the message transmission application, the window comprising at least one icon and the at least one message; and
   a Global Positioning System (GPS) module, being configured to provide a location information of the network apparatus;
   wherein the processor further determines that a correspondence relationship between a selected icon of the at least one icon and a selected message of the at least one message is created,
   the processor further derives at least one first keyword by analyzing a plurality of words comprised in the selected message according to a semantic analysis rule corresponding to the selected icon after determining that the correspondence relationship is created,
   the processor further derives at least one first recommendation message by searching a database according to the at least one first keyword, and the display screen further displays the at least one first recommendation message,
   wherein the processor further determines that a selected recommendation message of the at least one first recommendation message is selected,
   the network interface further transmits the selected recommendation message, and the display screen further displays the selected recommendation message within the window, and
   wherein the processor derives the at least one first recommendation message by searching the database according to the at least one first keyword and the location information.

2. The network apparatus of claim 1, wherein the processor further determines that a second keyword of the words comprised in the selected message is selected, the processor further derives a second recommendation message by searching the database according to the second keyword, the network interface further transmits the second recommendation message, and the display screen further displays the second recommendation message within the window.

3. The network apparatus of claim 1, further comprising:
   an input interface, being electrically connected to the processor and configured to receive a second keyword;
   wherein the processor further derives a second recommendation message by searching the database according to the second keyword, the network interface further transmits the second recommendation message, and the display screen further displays the second recommendation message within the window.

4. The network apparatus of claim 1, wherein the processor further derives at least one second keyword by analyzing the words comprised in the selected message according to the semantic analysis rule corresponding to the selected icon, the processor derives the at least one first recommendation message by searching the database according to the at least one first keyword and the at least one second keyword, wherein the at least one first keyword belongs to a first category, the at least one second keyword belongs to a second category, and the first category is different from the second category.

5. A network apparatus, comprising:
   a processor, being configured to execute a message transmission application;
   a network interface, being electrically connected to the processor and configured to transceive at least one message of the message transmission application; and
   a display screen, being electrically connected to the processor and configured to display a window of the message transmission application, the window comprising at least one icon and the at least one message; and
   a Global Positioning System (GPS) module, being configured to provide location information of the network apparatus,
   wherein the processor further determines that a correspondence relationship between a selected icon of the at least one icon and a selected message of the at least one message is created,
   the network interface further transmits a first instruction message to a server after determining that the correspondence relationship is created,
   the server derives at least one first keyword by analyzing a plurality of words comprised in the selected message according to a semantic analysis rule corresponding to the selected icon after receiving the first instruction message, and
   the server derives at least one first recommendation message by searching a database according to the at least one first keyword,
   wherein the network interface further receives a first response message from the server,
   the first response message carries the at least one first recommendation message, and the display screen further displays the at least one first recommendation message
   wherein the processor further determines that a selected recommendation message of the at least one first recommendation message is selected,
   the network interface further transmits the selected recommendation message, and the display screen further displays the selected recommendation message within the window, and
   wherein the network interface further transmits the location information to the server, the server derives the at least one first recommendation message by searching the database according to the at least one first keyword and the location information.

6. The network apparatus of claim 5, wherein the processor further determines that a second keyword of the words comprised in the selected message is selected, the network interface further transmits a second instruction message to the server, the server derives a second recommendation message by searching the database according to the second keyword after receiving the second instruction message, wherein the network interface further receives a second response message from the server, the second response message carries the second recommendation message, the network interface further transmits the second recommendation message, and the display screen further displays the second recommendation message within the window.

7. The network apparatus of claim 5, further comprising:
an input interface, being electrically connected to the processor and configured to receive a second keyword;
wherein the network interface further transmits a second instruction message to the server, the server derives a second recommendation message by searching the database according to the second keyword after receiving the second instruction message, wherein the network interface further receives a second response message from the server, the second response message carries the second recommendation message, the network interface further transmits the second recommendation message, and the display screen further displays the second recommendation message within the window.

8. The network apparatus of claim 5, wherein the server further derives at least one second keyword by analyzing the words comprised in the selected message according to the semantic analysis rule corresponding to the selected icon, the server derives the at least one first recommendation message by searching the database according to the at least one first keyword and the at least one second keyword, wherein the at least one first keyword belongs to a first category, the at least one second keyword belongs to a second category, and the first category is different from the second category.

9. A message providing method, comprising the following steps:
(a) transceiving at least one message by a network apparatus;
(b) displaying a window by the network apparatus, wherein the window comprises at least one icon and the at least one message;
(c) determining that a correspondence relationship between a selected icon of the at least one icon and a selected message of the at least one message by the network apparatus is created;
(d) deriving at least one first keyword by analyzing a plurality of words comprised in the selected message according to a semantic analysis rule corresponding to the selected icon by one of the network apparatus and a server after determining that the correspondence relationship is created
(e) deriving at least one first recommendation message by searching a database according to a location information and according to the at least one first keyword by one of the network apparatus and the server;
(f) displaying the at least one first recommendation message by the network apparatus;
(g) determining that a selected recommendation message of the at least one first recommendation message is selected by the network apparatus;
(h) transmitting the selected recommendation message by the network apparatus; and
(i) displaying the selected recommendation message within the window by the network apparatus.

10. The message providing method of claim 9, further comprising the following steps:
determining that a second keyword of the words comprised in the selected message is selected by the network apparatus;
deriving a second recommendation message by searching the database according to the second keyword by one of the network apparatus and the server;
transmitting the second recommendation message by the network apparatus; and
displaying the second recommendation message within the window by the network apparatus.

11. The message providing method of claim 9, further comprising the following steps:
receiving a second keyword by the network apparatus;
deriving a second recommendation message by searching the database according to the second keyword by one of the network apparatus and the server;
transmitting the second recommendation message by the network apparatus; and
displaying the second recommendation message within the window by the network apparatus.

12. The message providing method of claim 9, further comprising the following step:
deriving at least one second keyword by analyzing the words comprised in the selected message according to the semantic analysis rule corresponding to the selected icon by one of the network apparatus and the server;
wherein the step (e) derives the at least one first recommendation message by searching the database according to the at least one first keyword and the at least one second keyword, wherein the at least one first keyword belongs to a first category, the at least one second keyword belongs to a second category, and the first category is different from the second category.

* * * * *